United States Patent [19]

Hahnke et al.

[11] 4,061,464
[45] Dec. 6, 1977

[54] PROCESS FOR THE PREPARATION OF DYESTUFF COMPOSITIONS

[75] Inventors: Manfred Hahnke, Kelkheim, Taunus; Kurt Hohmann, Neu-Isenburg; Theodor Papenfuhs, Frankfurt am Main, all of Germany

[73] Assignee: Hoechst Aktiengesellschaft, Frankfurt am Main, Germany

[21] Appl. No.: 620,385

[22] Filed: Oct. 7, 1975

[30] Foreign Application Priority Data

Dec. 15, 1973 Germany ............................. 2362510

Related U.S. Application Data

[63] Continuation of Ser. No. 443,306, Feb. 19, 1974, abandoned.

[51] Int. Cl.$^2$ .............................................. C09B 67/00
[52] U.S. Cl. ............................................ 8/79; 8/7; 8/12; 8/39 R; 8/41 R; 8/54; 8/54.2; 8/85 R; 8/85 B; 8/92; 8/93; 8/168 A; 8/168 AB; 8/168 B; 8/168 CA; 8/177 AB; 8/179
[58] Field of Search ............ 8/41, 44, 45, 46, 168 AB, 8/177 AB, 41 A, 41 C, 79, 93, 41 A, 41 C, 35 B, 85 R

[56] References Cited

U.S. PATENT DOCUMENTS

| 3,120,508 | 2/1964 | Braun et al. .................. 260/161 |
| 3,617,185 | 11/1971 | Drantz ............................... 8/93 |
| 3,686,162 | 8/1972 | Artz ................................ 260/158 |
| 3,781,266 | 12/1973 | Dietz .............................. 260/157 |

FOREIGN PATENT DOCUMENTS

| 1,449,325 | 10/1965 | France. |
| 2,209,478 | 9/1973 | Germany. |
| 7,402,116 | 8/1974 | Netherlands. |
| 1,241,707 | 8/1971 | United Kingdom. |
| 1,222,945 | 2/1971 | United Kingdom. |
| 1,252,368 | 11/1971 | United Kingdom. |
| 1,059,109 | 2/1967 | United Kingdom. |

*Primary Examiner*—A. Lionel Clingman
*Attorney, Agent, or Firm*—Connolly and Hutz

[57] ABSTRACT

A process for the preparation of new dyestuff compositions which contain one or more basic dyestuffs in the form of dyestuff bases from the series of the triarylmethane, indoldiarylmethane, azine, oxazine, thiazine or xanthene dyestuffs or one or more basic dyestuffs of the series of the azo, anthraquinone, phthalocyanine, styryl, quinophthalone, benzoxanthene, naphthoylene-benzimidazole, naphthalimide or nitro series, carrying a primary, secondary or tertiary amino group or a guanidino or hydrazino group, as well as one or more non-ionic or slightly cationic surface-active agents and, optionally, water and/or an organic solvent miscible with water, which process comprises synthesizing the dyestuff in the surface-active agent optionally containing water and/or an organic solvent miscible with water, and then adding, if necessary, water and/or a solvent miscible with water and a further surface-active agent, this process of the invention having the advantage that an intermediate isolation, drying or grinding of the dyestuffs contained in the dyestuff compositions defined above is not necessary, so that the dyestuffs need not be introduced as substance into the surface-active agent and the solvent in a process wherein compositions of this type are prepared by a usual mixing, kneading or melting process; moreover, higher dyestuff yields are obtained in the dyestuff synthesis, and it allows to prepare dyestuff compositions from dyestuffs which are difficult to be isolated in substance after synthesis and often precipitate as oily or smeary products. The dyestuff compositions obtained according to the process of the invention, which are pastes or liquids, have a high stability upon storage. After being diluted with an aqueous solution of an amount at least equivalent to the dyestuff of an inorganic or organic acid, as well as, optionally, after the addition of dyeing and/or printing auxiliaries, the novel dyestuff compositions are suitable for dyeing or printing textile material containing acid groups.

2 Claims, No Drawings

PROCESS FOR THE PREPARATION OF DYESTUFF COMPOSITIONS

This application is a continuation of application Ser. No. 443,306 filed Feb. 19, 1974 and now abandoned.

The present invention relates to the preparation of dyestuff compositions.

Dyestuff compositions are known which contain a basic dyestuff, a dispersing agent, an acid and water and, optionally, an organic solvent. Those compositions are homogeneous solutions or dispersions.

Acid dyestuff compositions of this type, especially those having a high dyestuff concentration, can, however, not be prepared from all basic dyestuffs because a great number of basic dyestuffs are not sufficiently soluble in an acid medium in order to yield highly concentrated dyestuff compositions and the dyestuff compositions in the form of dispersions are not sufficiently stable upon storage.

New dyestuff compositions which contain one or more basic dyestuffs, one or more non-ionic or slightly cationic surface active agents and, optionally, water and/or an organic solvent miscible with water, basic dyestuffs being those which are in the form of a dyestuff base and contain a primary, secondary or tertiary amino group, a guanidino group or a hydrazino group, do not have these disadvantages.

These dyestuff compositions can be prepared by dissolving the dyestuffs at a temperature ranging from about 20° to 150° C, optionally by adding water and/or an organic solvent miscible with water, in the surface-active agent by stirring or kneading, optionally followed by granulating or spraying.

These dyestuff compositions may also be prepared by melting the inorganic or organic salt of a basic dyestuff with the addition of an amount of inorganic or organic base equivalent to the anion, with the surface-active agent and, optionally, with water and/or an organic solvent.

By modifying the embodiments of the two processes mentioned above it was found in the present patent application, that these dyestuff compositions can also be prepared by synthesizing the dyestuff already in the surface-active agent which optionally contains water and/or a solvent miscible with water.

The dyestuff can be prepared according to the usual methods suitable for the preparation of those dyestuffs, especially by the condensation or the coupling reaction, for example by the azo coupling.

So the azo dyestuffs can be prepared from diazonium salts or diazoamino compounds by coupling with the usual coupling components.

Condensation reactions for the preparation of dyestuffs which can be carried out according to the invention in surface-active agents, are for example those of amino compounds with compounds containing a group capable of being split off, for example, a halogen atom, for example, chlorine or bromine, or the sulfato group (—OSO$_3$H), an alkylsulfonyloxy or arylsulfonyloxy group, such as the methyl or the p-toluylsulfonyloxy group, the amino, an alkoxy group, such as the methoxy or ethoxy group, or the sulfone group. These amino compounds may be aromatic carbo or heterocyclic or aliphatic primary and secondary amines. Compounds containing halogen, preferably chlorine or bromine, of the aromatic series are those the halogen atom of which is linked to an aromatic carbon atom, however, the condensation reactions with acid halides or reactions of that type between carboxylic acids or carboxylic acid anhydrides with amino compounds are also possible.

Moreover, dyestuffs can be prepared which require reactions of primary, secondary or tertiary aromatic amines with aromatic aldehydes or ketones or of those amino compounds with aromates containing phenolic hydroxy groups or of aromatic carboxylic acid anhydrides with phenolic compounds or reactions with aromatic diamines or aminophenols, such as ring closure reactions.

After the preparation of the dyestuffs the amount of water and/or of a solvent miscible with water which is desired or necessary and a further surface-active agent may optionally be added in order to obtain the new dyestuff compositions mentioned initially.

As dyestuffs which are contained in the dyestuff compositions prepared according to the invention the following are preferred: Dyestuff bases, i.e., carbinol bases or anhydro bases capable of forming a dyestuff salt sparingly soluble or insoluble in water with the acid, of the triarylmethane, indoldiarylmethane, azine, oxazine, thiazine or xanthene dyestuff class, among which the triarylmethane, the xanthene, the oxazine and the azine dyestuffs are preferred; dyestuffs which contain a primary, secondary or tertiary amino group, a guanidino or hydrazino group, especially those of the azo, anthraquinone, phthalocyanine, styryle, quinophthalone, benzoxanthene, naphthoylenebenzimidazole, naphthalimide or nitro series.

Suitable dyestuffs of the type primarily mentioned are described for example, in French Pat. Nos. 2,045,397, 2,099,211, 2,121,198, 2,036,035, 2,030,081, 2,024,450, 1,560,192, 1,573,133, 1,533,149, in Belgian Pat. Nos. 755,141, 761,851, 782,681, 561,613, in German Pat. Nos. 1,161,370, 1,161,371, 949,649, and in Swiss Pat. Nos. 519,552, 521,418, 522,022; dyestuffs of the last-mentioned type are described in German Pat. Nos. 1,011,396, 1,125,879, 1,282,816, 1,150,652, 1,041,910, 1,014,519, 1,121,023, 1,051,240, 963,502, 1,014,518, 1,061,010, 1,044,310 and in U.S. Pat. Nos. 2,834,794, 2,834,793, 2,701,802, 3,079,377, 2,888,467, 3,023,212.

Suitable non ionic or slightly cationic surface-active agents are, for example:

a. ethers of polyhydroxy compounds, polyoxalkylated fat alcohols, polyoxsalkylated polyols, polyoxalkylated mercaptanes and aliphatic amines, polyoxalkylated alkyl phenols and -naphthols, polyoxalkylated alkylaryl mercaptanes and alkylaryl amines;

b. fat acid esters of the ethylene and the polyethylene glycols and of the propylene and butylene glycol, the glycerol or the polyglycerols and the pentaerythritol, as well as of sugar alcohols, such as sorbitol, sorbitanes and of the saccharose;

c. N-hydroxyalkyl-carbonamides, polyoxalkylated carbonamides and sulfonamides;

d. polyoxethylated polypropylene and polybutylene glycols for e. polyoxethylated aliphatic amino-N-oxides.

Among these compounds, polyoxalkylated hydroxy compounds and polyoxalkylated amino compounds are preferred.

Especially suitable are, for example, addition products of 15 mols of ethylene oxide to 1 mold of p-tert.-octyl phenol, 30 mols of ethylene oxide to castor oil, 20 mols of ethylene oxide to 1 mol of the alcohol of the formular C$_{16}$H$_{33}$OH, addition products of 15 to 30 mols of ethylene oxide to nonylphenol, addition products of 15 or 30 mols of ethylene oxide to 1 mol of the amine of the formula $C_{12}H_{25}NH_2$ or $C_{18}H_{37}NH_2$, moreover, addition products of about 20 mols of ethylene oxide to 1 mol of stearic acid, are also suitable.

As organic solvents miscible with water which may, optionally be contained in the dyestuff compositions, there may be mentioned, for example: polyvalent alcohols, the esters or ethers thereof, such as glycol, methyl or butyl glycol, diethylene glycol, triethylene glycol, propandiol, butandiol, hexandiol, glycol carbonate, glycerol or glycerol monoacetate, diacetone alcohol, ketones, such as acetone, acetals, dioxane, moreover, dimethyl sulfoxide, dimethyl formamide, dimethyl acetamide, α- and β-hydroxyalkyl nitriles, tetramethylene sulfone, N-methylpyrrolidone or tris-(dimethylamido)-phosphate.

The dyestuff compositions prepared according to the invention are pastes, especially, however, liquids which contain the dyestuffs in high concentrations, for example, up to 50% by weight, preferably, from 10 to 30% by weight and have a high stability upon storage.

After being diluted with an aqueous solution of an amount at least equivalent to the dyestuff of an inorganic or organic acid, for example, sulfuric acid, phosphoric acid, formic acid, acetic acid, lactic acid or mixtures thereof, as well as, optionally, after the addition of dyeing and/or printing auxiliaries, the dyestuff compositions obtained according to the invention are suitable for dyeing or printing textile material containing acid groups or corresponding non structured material.

The dyestuff compositions are advantageously diluted with the dilute aqueous solutions of the acids.

Suitable textile materials are fibers, filaments, flocks, woven and knitted fabrics of polymers of acrylonitrile or copolymers of acrylonitrile with other vinyl compounds, for example, vinyl chloride, vinyl fluoride, vinylidene chloride, vinyl acetate or vinyl propionate, vinyl pyridine, vinyl imidazole, vinyl pyrrolidone, vinyl alcohol, acrylic or methacrylic acid ester, or acryl amides which contain acid groups due to the preparation. Moreover, acid modified polyacrylonitrile materials are used, as described in U.S. Pat. Nos. 2,837,500 and 2,837,501 as well as acid modified polyamide fibers, for example, polycondensation products of 4,4'-diamino-2,2'-diphenyldisulfonic acids or 4,4'-diamino-2,2'-diphenylalkandisulfonic acids and starting products forming polyamides, polycondensation products of monoaminocarboxylic acids or the amide-forming derivatives thereof or dibasic carboxylic acids and diamines with aromatic dicarboxysulfonic acids, for example, polycondensation products of caprolactam or hexamethylene diammonium adipate with potassium-3,5-dicarboxybenzene-sulfonate, or acid modified polyester fibers, such as polycondensation products of aromatic polycarboxylic acids, for example, terephthalic acid or isophthalic acid with polyvalent alcohols, for example, ethylene glycol and 1,2- or 1,3-dihydroxy-3-(3'-sodiumsulfopropoxy)-propane, 2,2-dimethylol-1-(3'-sodium-sulfopropoxy)-butane, 2,2-bis-(3'-sodiumsulfopropoxyphenol)-propane or 3,5-dicarboxybenzenesulfonic acid or sulfonated terephthalic acid, sulfonated 4-methoxy-benzene-carboxylic acid or sulfonated diphenyl-4,4'-dicarboxylic acid.

The dyestuff compositions of the invention may also, advantageously, be used in combination with water-soluble cationic dyestuffs for dyeing and printing fibers containing acid groups, because they are applied according to the usual dyeing or printing processes.

The dyestuff compositions are also suitable for dyeing or printing tanned cellulose fibers, silk, acetate silk and leather and for dyeing paper.

This process of the invention has the advantage that an intermediate isolation, drying or grinding of the dyestuffs contained in the dyestuff compositions and which have to be introduced as substance according to the processes of the copending applications is not necessary; moreover, higher dyestuff yields are obtained in the dyestuff synthesis. Moreover, this novel process of the invention allows to prepare dyestuff compositions from dyestuffs which are difficult to be isolated after synthesis and often precipitate as oily or smeary products.

The following examples illustrate the invention, the parts and percentages being by weight, unless stated otherwise:

EXAMPLE 1

40 Parts of moist 4-nitrobenzene-diazonium-tetrafluoroborate (=about 0.1 mol) were slowly introduced at room temperature in a mixture of 70 parts of a nonyl phenol oxethylated with 23 mols of ethylene oxide, 10 parts of water and 19.2 parts of N-ethyl-N-β-dimethylaminoethyl aniline. The mixture was stirred until the coupling had been finished. 133 parts of dimethyl formamide were added to the molten coupling mixture which was rendered alkaline with sodium hydroxide solution. The dyestuff solution so obtained may, optionally, be filtered to eliminate slight amounts of insoluble portions. It contained about 12.5% of the dyestuff of the formula

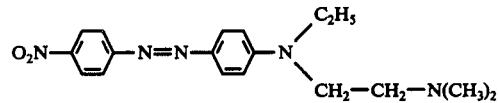

A clear dye bath was obtained when pouring 8 parts of that composition in 1000 parts of water at 60° C and 4 parts of 50% acetic acid. This dyestuff composition was used to dye polyacrylonitrile fibers and acid modified polyester fibers in red brown shades having good fastness to light and to wet processing according to the usual dyeing methods.

EXAMPLE 2

31.6 Parts of 4-bromo-1-methylamino-anthraquinone, 29 parts of diethylamino-propyl amine and 70 parts of a stearyl alcohol oxethylated with 25 mols of ethylene oxide were slowly heated to 120° C and stirred at 120° C for about 4 hours. The reaction mixture turned blue. The melt heated to 100°-120° C was poured into an undercooled bowl. The dyestuff composition of the formula

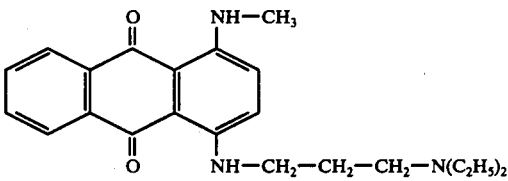

dyed polyacrylonitrile fibers from slightly acid aqueous bath in blue shades having very good fastness to light and to wet processing.

EXAMPLE 3

15 Parts of a nonyl phenol oxethylated with 30 mols of ethylene oxide were heated to 80° C in a flask provided with stirrer, reflux cooler and thermometer. After adding 3.43 parts of the compound of the formula

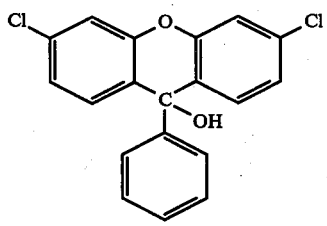

and 5 parts of aniline the mixture was heated to 170°–180° C. A red violet melt was formed which contained the chloride of the dyestuff of the formula

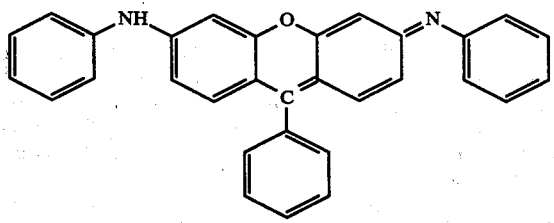

After 3 hours the mixture was cooled to 100° C. 1.6 parts of a 50% aqueous sodium hydroxide solution were added, whereafter the excess aniline was filtered off under the water jet vacuum within 2 hours. The precipitated sodium chloride was filtered off while hot. After cooling a wax-like melt was obtained which was dissolved with a 1% aqueous acetic acid of about 60° C to yield a clear violet dyestuff dispersion. Polyacrylonitrile or acid modified polyester were dyed in a level deep violet shade having very good fastness to light and to wet processing.

When using o-toluidine instead of aniline a dyestuff composition was obtained which yielded a red violet shade. In this case the reaction time was increased to 6 hours.

EXAMPLE 4

25 Parts of an oleyl alcohol oxethylated with 25 mols of ethylene oxide and then etherified with isopropanol were heated in a flask provided with stirrer, reflux cooler and thermometer to 60° C and thereby molten. After the addition of 3.05 parts of pararosaniline, 2.79 parts of aniline and 0.25 part of benzoic acid the mixture was rapidly heated to 160°–170° C. At that temperature within 6 hours and under the brisk evolution of ammonia a homogeneous solution was obtained in the surface-active agent, which had the formula

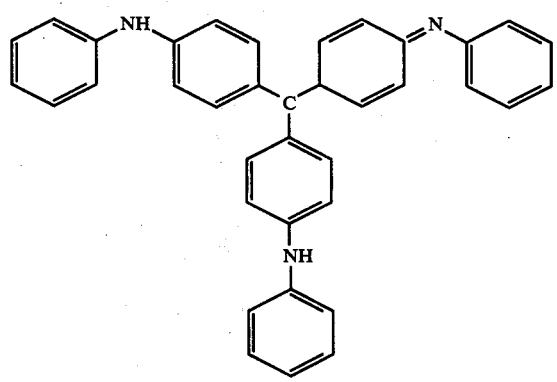

After cooling to 60° C 8 parts of isobutanol were added with stirring. A composition was obtained which was liquid at room temperature and turned to a clear blue dyestuff dispersion with a 1% aqueous formic acid of 20° C. When dyeing polyacrylonitrile, a brilliant neutral blue dyeing of high tinctorial strength and having very good fastness properties was obtained.

When using 5 parts of o-toluidine instead of aniline a corresponding brilliant violet was obtained. In this case, the excess o-toluidine was distilled off under vacuum after a 6 hours' reaction period.

EXAMPLE 5

25 Parts of a nonyl phenol oxethylated with 15 mols of ethylene oxide were heated with 3.05 parts of pararosaniline, 2.56 parts of o-chloroaniline and 0.25 part of benzoic acid for 2 hours to 150° C and for 4 hours to 160° C whereupon ammonia developped. The mixture was cooled to 80° C and a 30% aqueous sodium hydroxide solution was added in such an amount that a homogeneous red-brown solution of the following dyestuff was obtained in the surface-active agent used:

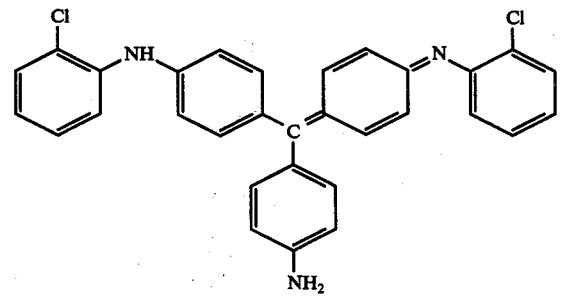

After cooling to room temperature a liquid homogeneous composition remained which yielded a clear dispersion of the dyestuff acetate with a 1% aqueous acetic acid. Polyacrylonitrile was dyed in a red violet shade of high tinctorial strength and having very good fastness properties as to wet processing.

EXAMPLE 6

80 Parts of talcum fat alcohol oxethylated with 30 mols of ethylene oxide were molten by heating to 60° C. AFter introducing 13.6 parts of m-xylylene diamine and 19 parts of 4-bromo-naphthalic acid-assymetrical-m-xylidide the mixture was rapidly heated to 110°–120° C and for a further 6 hours to 110°–120° C, followed by cooling to 80° C. 4 g of a 50% aqueous sodium hydroxide solution were added with stirring, whereupon after 10 minutes a homogeneous solution of the following dyestuff was obtained in the surface-active agent;

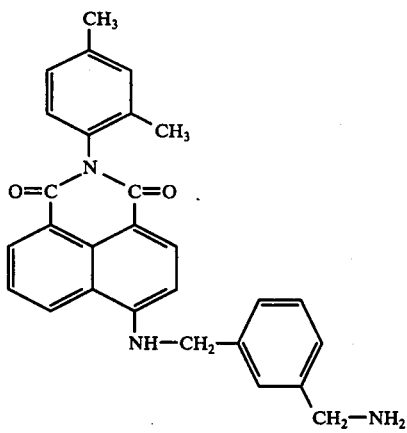

This composition was taken up with the 100-fold amount of a 2% aqueous acetic acid of about 60° C whereupon a stable opalescent yellow dyestuff dispersion was obtained. This dispersion could be used for dyeing polyacrylonitrile yielding a brilliant greenish fluorescent yellow having good fastness properties as to wet processing.

EXAMPLE 7

80 Parts of a diamyl phenol oxethylated with 23 parts of ethylene oxide were heated to 60° C. 15.2 parts of 4-chloronaphthalic acid anilide and 18.6 parts of β-dibutylaminopropylamine were added, followed by heating to 110°-120° C for 4 hours and cooling to 80° C. 4 g of a 50% aqueous sodium hydroxide solution were added. After 10 minutes a homogeneous solution of the following dyestuff was obtained in the surface-active agent used:

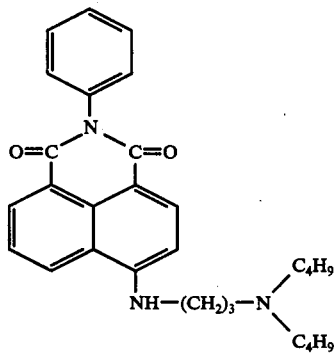

The composition was dissolved with the 100-fold amount of a 2% aqueous acetic acid of 60° C to yield a slightly turbid yellow dyestuff dispersion. This dyestuff dispersion could be used to dye polyacrylonitrile in a brilliant fluorescent yellow having good fastness to wet processing.

EXAMPLE 8

100 Parts of a surface-active agent consisting of 95 parts of a nonyl phenol oxethylated with 20 mols of ethylene oxide and 5 parts of water were stirred at 20° C with 4.8 parts of N-ethyl-N-(β-dimethylamino-ethyl)-aniline and 25.25 parts of a 20% standardization of a diazoamino compound of the formula

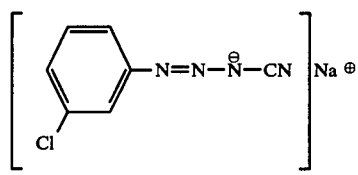

While cooling to 20° C within an hour, 22.5 parts of a 30% aqueous hydrochloric acid were added dropwise, whereupon a deep red reaction mass was formed. The mass was stirred for another hour, 7.5 parts of sodium hydroxide solution were added and it was heated to 50°-60° C. After 1 hour the upper phase which separated was taken off. It was a homogeneous solution of the dyestuff of the formula

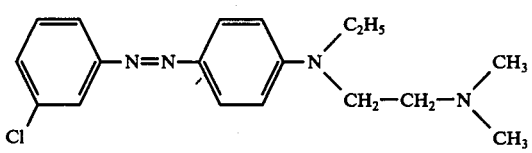

in the surface-active agent.

EXAMPLE 9

In a flask provided with stirrer, reflux cooler and thermometer, 3.15 parts of o-nitrochlorobenzene, 1.31 parts of bis-(3-amino-n-propyl)-amine and 1.6 parts of a 50% aqueous sodium hydroxide solution were added to 16 parts of a melt heated to 60° C of a stearyl alcohol oxethylated with 25 mols of ethylene oxide. Within 1 hour, the melt was heated to 115-120° C. After 8 hours at that temperature, the clear yellow melt was separated from the salt precipitated by filtration above 60° C. After cooling a wax-like product resulted which contained the dyestuff of the formula

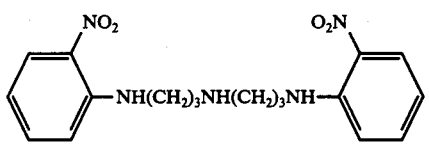

Upon dissolving 1 part of the composition in 100 parts of a 1% aqueous acetic acid of about 60° C a stable clear dispersion of the dyestuff acetate was obtained. When dyeing polyacrylonitrile a clear reddish yellow having very good fastness properties was obtained.

Instead of 1.6 parts of a 50% aqueous sodium hydroxide solution 1.1 parts of calcined sodium carbonate could also be used. The reaction could also, advantageously, be carried out in 4 parts of the surface-active agent mentioned above. After separation of the salt by filtration the residual 12 parts of the surface-active agent were added as a melt at 80° C.

We claim:
1. A process for the preparation of a liquid or pasty dyestuff composition containing 10 to 50% by weight of a basic nitro dyestuff which is present in the form of its free dyestuff base and carries a primary, secondary or tertiary amino group or a guanidino or hydrazino group, and containing 50 to 80% by weight of a nonionic surface-active agent which process comprises synthesizing the dyestuff in the surface-active agent.

2. A process according to claim 1 wherein said dyestuff composition contains water or an organic solvent miscible with water, or both water and an organic solvent miscible with water which process comprises synthesizing the dyestuff in the surface-active agent containing said water or organic solvent or both.

* * * * *